(12) United States Patent
Bey et al.

(10) Patent No.: US 8,718,981 B2
(45) Date of Patent: May 6, 2014

(54) MODULAR SENSOR ASSEMBLY INCLUDING REMOVABLE SENSING MODULE

(75) Inventors: Paul Prehn Bey, Gahanna, OH (US); William Hoover, Plain City, OH (US); Jamie Speldrich, Freeport, IL (US); Ryan Jones, Dublin, OH (US)

(73) Assignee: Honeywell International Inc., Morristown, NJ (US)

( * ) Notice: Subject to any disclaimer, the term of this patent is extended or adjusted under 35 U.S.C. 154(b) by 227 days.

(21) Appl. No.: 13/103,891

(22) Filed: May 9, 2011

(65) Prior Publication Data

US 2012/0290268 A1    Nov. 15, 2012

(51) Int. Cl.
*G06F 15/00* (2006.01)

(52) U.S. Cl.
USPC .................................. 702/189; 700/66; 73/431

(58) Field of Classification Search
USPC .................................. 702/189; 700/66; 73/431
See application file for complete search history.

(56) References Cited

U.S. PATENT DOCUMENTS

| | | |
|---|---|---|
| 3,410,287 A | 11/1968 | Van Der Heyden et al. |
| 4,090,215 A | 5/1978 | Buchan et al. |
| 4,303,984 A | 12/1981 | Houvig |
| 4,337,658 A | 7/1982 | Motchenbacher et al. |
| 4,341,107 A | 7/1982 | Blair et al. |
| 4,494,183 A | 1/1985 | Bayer et al. |
| 4,668,102 A | 5/1987 | Mott |
| 4,845,649 A | 7/1989 | Eckhardt et al. |
| 4,907,449 A | 3/1990 | Call et al. |
| 5,000,478 A | 3/1991 | Kerastas |
| 5,012,667 A | 5/1991 | Kruse |
| 5,038,305 A | 8/1991 | Kumar et al. |
| 5,050,429 A | 9/1991 | Nishimoto et al. |
| 5,070,732 A * | 12/1991 | Duncan et al. ................. 73/431 |
| 5,089,979 A | 2/1992 | McEachern et al. |
| 5,184,107 A | 2/1993 | Maurer |
| 5,251,157 A | 10/1993 | Prather |

(Continued)

FOREIGN PATENT DOCUMENTS

| | | |
|---|---|---|
| DE | 3446248 | 6/1986 |
| DE | 3803104 | 8/1989 |

(Continued)

OTHER PUBLICATIONS

US 7,021,135, 04/2006, Korniyenko et al. (withdrawn).

(Continued)

*Primary Examiner* — John Breene
*Assistant Examiner* — Haihui Zhang
(74) *Attorney, Agent, or Firm* — Seager Tufte & Wickhem LLC.

(57) ABSTRACT

A modular sensor assembly in which a sensing module may be packaged and provided separately from a signal processing module and which, in some applications, may facilitate disposal and/or replacement of the sensing module when exposed to a "dirty" or "contaminated" environment without requiring disposal and/or replacement of the entire sensor assembly. In certain applications, the sensing module may include at least one transducer or sensor and a local memory containing a set of conditioning coefficients. The sensing module may be removably coupled to a signal processing module which, in some cases, may be configured to download the set of conditioning coefficients stored in the local memory of the sensing module, and to use the set of conditioning coefficients to produce a substantially linearized output signal.

20 Claims, 11 Drawing Sheets

(56) References Cited

U.S. PATENT DOCUMENTS

| | | |
|---|---|---|
| 5,303,167 A | 4/1994 | Bonne |
| 5,321,638 A | 6/1994 | Witney |
| 5,329,818 A | 7/1994 | Frick et al. |
| 5,365,768 A | 11/1994 | Suzuki et al. |
| 5,365,784 A | 11/1994 | Morrissey |
| 5,410,916 A | 5/1995 | Cook |
| 5,459,351 A | 10/1995 | Bender |
| 5,479,096 A | 12/1995 | Szczyrbak et al. |
| 5,631,417 A | 5/1997 | Harrington et al. |
| 5,735,267 A | 4/1998 | Tobia |
| 5,808,210 A | 9/1998 | Herb et al. |
| 5,827,960 A | 10/1998 | Sultan et al. |
| 5,892,145 A | 4/1999 | Moon et al. |
| 5,946,641 A | 8/1999 | Morys |
| 6,032,109 A | 2/2000 | Ritmiller, III |
| 6,035,721 A | 3/2000 | Krisch |
| 6,053,031 A | 4/2000 | Kullik et al. |
| 6,181,574 B1 | 1/2001 | Loibl |
| 6,243,654 B1 | 6/2001 | Johnson et al. |
| 6,321,171 B1 | 11/2001 | Baker |
| 6,543,449 B1 | 4/2003 | Woodring et al. |
| 6,591,674 B2 | 7/2003 | Gehman et al. |
| 6,595,049 B1 | 7/2003 | Maginnis, Jr. et al. |
| 6,623,616 B1* | 9/2003 | Malver et al. ............... 205/775.5 |
| 6,655,207 B1 | 12/2003 | Speldrich et al. |
| 6,681,623 B2 | 1/2004 | Bonne et al. |
| 6,681,625 B1 | 1/2004 | Berkcan et al. |
| 6,684,695 B1 | 2/2004 | Fralick et al. |
| 6,687,642 B2 | 2/2004 | Maher et al. |
| 6,701,274 B1 | 3/2004 | Eryurek et al. |
| 6,724,612 B2 | 4/2004 | Davis et al. |
| 6,725,169 B2 | 4/2004 | Thielman et al. |
| 6,725,731 B2 | 4/2004 | Wiklund et al. |
| 6,761,165 B2 | 7/2004 | Strickland, Jr. |
| 6,769,285 B2 | 8/2004 | Schneider et al. |
| 6,805,003 B2 | 10/2004 | Ueki et al. |
| 6,820,481 B1 | 11/2004 | Weber et al. |
| 6,823,711 B1 | 11/2004 | Chen et al. |
| 6,867,602 B2 | 3/2005 | Davis et al. |
| 6,871,537 B1 | 3/2005 | Gehman et al. |
| 6,904,799 B2 | 6/2005 | Cohen et al. |
| 6,904,907 B2 | 6/2005 | Speldrich et al. |
| 6,911,894 B2 | 6/2005 | Bonne et al. |
| 6,912,918 B1 | 7/2005 | Lynnworth et al. |
| 6,923,069 B1 | 8/2005 | Stewart |
| 6,929,031 B2 | 8/2005 | Ford et al. |
| 6,945,118 B2 | 9/2005 | Maitland, Jr. et al. |
| 6,949,928 B2 | 9/2005 | Gonzalez Ballester et al. |
| 6,958,565 B1 | 10/2005 | Liu |
| 6,958,689 B2 | 10/2005 | Anderson et al. |
| 6,989,433 B2 | 1/2006 | Wong et al. |
| 7,000,612 B2 | 2/2006 | Jafari et al. |
| 7,016,792 B2 | 3/2006 | Schneider |
| 7,024,937 B2 | 4/2006 | James |
| 7,060,197 B2 | 6/2006 | Fuertsch et al. |
| 7,061,325 B2 | 6/2006 | Pitz |
| 7,073,392 B2 | 7/2006 | Lull et al. |
| 7,077,004 B2 | 7/2006 | Mitter |
| 7,084,378 B2 | 8/2006 | Griffin et al. |
| 7,107,835 B2 | 9/2006 | Korniyenko et al. |
| 7,159,457 B2 | 1/2007 | Wildgen |
| 7,162,927 B1 | 1/2007 | Selvan et al. |
| 7,193,498 B2 | 3/2007 | Kawamoto et al. |
| 7,210,346 B1 | 5/2007 | Hoover et al. |
| 7,222,037 B2 | 5/2007 | Mushirahad et al. |
| 7,233,845 B2 | 6/2007 | Veinotte |
| 7,243,541 B1 | 7/2007 | Bey et al. |
| 7,258,003 B2 | 8/2007 | Padmanabhan et al. |
| 7,260,994 B2 | 8/2007 | Oboodi et al. |
| 7,266,999 B2 | 9/2007 | Ricks |
| 7,277,802 B1 | 10/2007 | Dmytriw |
| 7,278,309 B2 | 10/2007 | Dmytriw et al. |
| 7,280,927 B1 | 10/2007 | Dmytriw |
| 7,318,351 B2 | 1/2008 | Cobianu et al. |
| 7,331,239 B1 | 2/2008 | Wang et al. |
| 7,343,823 B2 | 3/2008 | Speldrich |
| 7,373,819 B2 | 5/2008 | Engler et al. |
| 7,430,918 B2 | 10/2008 | Selvan et al. |
| 7,467,547 B2 | 12/2008 | Oda et al. |
| 7,493,823 B2 | 2/2009 | Stewart et al. |
| 7,520,051 B2 | 4/2009 | Becke et al. |
| 7,520,184 B2 | 4/2009 | Uemura et al. |
| 7,597,005 B2 | 10/2009 | McMonigal |
| 7,634,437 B1 | 12/2009 | Tanpoco |
| 7,635,077 B2 | 12/2009 | Schubert |
| 7,635,091 B2 | 12/2009 | Engler et al. |
| 7,710,128 B2 | 5/2010 | Alimi et al. |
| 7,769,557 B2 | 8/2010 | Bey et al. |
| 7,829,982 B2 | 11/2010 | Shirasaka et al. |
| 7,832,269 B2 | 11/2010 | Bey, Jr. et al. |
| 7,927,010 B2 | 4/2011 | Schick et al. |
| 7,934,411 B2 | 5/2011 | Koch |
| 2003/0062045 A1 | 4/2003 | Woodring et al. |
| 2005/0016534 A1 | 1/2005 | Ost |
| 2005/0247106 A1 | 11/2005 | Speldrich et al. |
| 2006/0201247 A1 | 9/2006 | Speldrich et al. |
| 2007/0197922 A1 | 8/2007 | Bradley et al. |
| 2007/0209433 A1 | 9/2007 | Gehman et al. |
| 2007/0271069 A1 | 11/2007 | Dmytriw et al. |
| 2007/0271070 A1 | 11/2007 | Dmytriw et al. |
| 2007/0295082 A1 | 12/2007 | Kilian |
| 2008/0236273 A1 | 10/2008 | Dmytriw et al. |
| 2009/0083459 A1* | 3/2009 | Harish ........................... 710/63 |
| 2009/0288484 A1 | 11/2009 | Selvan et al. |
| 2010/0206046 A1* | 8/2010 | Bentley et al. ............... 73/29.02 |
| 2010/0268485 A1 | 10/2010 | Bey et al. |
| 2011/0015507 A1* | 1/2011 | Mannheimer ................. 600/324 |

FOREIGN PATENT DOCUMENTS

| | | |
|---|---|---|
| EP | 0574288 | 8/1997 |
| EP | 0892249 | 1/1999 |
| EP | 2184589 | 5/2010 |
| GB | 2065890 | 7/1981 |
| JP | 2001174304 | 6/2001 |
| KR | 20050075225 | 7/2005 |
| WO | WO 94/12940 | 6/1994 |
| WO | WO 00/34744 | 6/2000 |

OTHER PUBLICATIONS

ElectroSonic, "Product Catalog," pp. 29-30, Jan. 2007.

Fan et al., "Design and Fabrication of Artificial Lateral Line Flow Sensors," Institute of Physics Publishing, Journal of Micromechanics and Microengineering, vol. 12, pp. 655-661, 2002.

Honeywell, "HIH-4030/31 Series Humidity Sensors," Mar. 2008.

Honeywell, "Honeywell Introduces the FS300-100 Combi-Sensor for Boiler Systems," Jun. 11, 2004.

Honeywell, "Installation Instructions for the HIH-4030/31 Humidity Sensors," Issue 2, 50022701, 4 pages, Aug. 2007.

Honeywell, "Interactive Catalog Replaces Catalog Pages, 22/24/26PC Series" pp. 17-20, prior to May 9, 2011.

Honeywell, "Interactive Catalog Replaces Catalog Pages, 40PC Series," pp. 31-33, prior to May 9, 2011.

Honeywell, "Microstructure Pressure Sensors 0 psi to 1 psi through 0 psi to 100 psi, ASDX DO Series," 6 pages, 2005.

Honeywell, "ZMD Heimdal Combi-Sensor ASIC," 15 pages, Nov. 23, 2006.

http://ieee1451.nist.gov/calibteds.html, "Below is an Example of a Calibration TEDS," 1 page, prior to May 17, 2006.

http://ieee1451.nist.gov/chanteds.html, "Below is an Example of a Channel TEDS," 1 page, prior to May 17, 2006.

http://ieee1451.nist.gov/correc.html, "Correction (by Use of Data in a Calibration TEDS)," 1 page, prior to May 17, 2006.

http://ieee1451.nist.gov/metateds.html, "Below is an Example of a Meta TEDS," 2 pages, prior to May 17, 2006.

http://ieee1451.nist.gov/tedssen.html, "TEDS," 2 pages, prior to May 17, 2006.

http://web.archive.org/web/20050407175641, "MAX 1463 Low-Power, Two Channel Sensor Signal Processor," Maxim 2 pages, prior to May 17, 2006.

(56) References Cited

OTHER PUBLICATIONS http://web.archive.org/web/20050831115252, "MAX 1455 Low-Cost Automotive Sensor Signal Conditioner," Maxim, 3 pages, prior to May 17, 2006.

http://web.archive.org/web/20050906123256, "MAX 1452 Low-Cost, Precision Sensor Signal Conditioner," Maxim, 3 pages, prior to May 17, 2006.

http://web.archive.org/web/20050906233240, "MAX 1457," Maxim, 3 pages, prior to May 17, 2006.

http://web.archive.org/web/20060114014946, "DS4303, DS4303K, Voltage Sample and Infinite Hold," 3 pages prior to May 17, 2006.

http://web.archive.org/web/20060317003924, "Sensors (Including IEEE-P1451.4 Plug-and-Play Sensors) Overview," Maxim Integrated Products, 2 pages, copyright 2006.

http://web.archive.org/web/20060322155856, "Pressure Sensors," Maxim, 4 pages, prior to May 17, 2006.

http://web.archive.org/web/20060322155905, "Temperature Sensors," Maxim, 7 pages, prior to May 17, 2006.

http://web.archive.org/web/20060322160322160032, "Sample and Infinite Hold (for Calibration)," 2 pages, Copyright 2006.

http://web.archive.org/web/20060322174055, "DS4305 Sample-and-Infinite-Hold Voltage Reference," Maxim, 3 pages prior to May 17, 2006.

Maxim, "MAX 1463 Low-Power, Two-Channel Signal Processor," 50 Pages, Nov. 2004.

Maxim, "MAX 1464 Low-Power, Low-Noise Multichannel Sensor Signal Processor," 47 pages, revised Feb. 2005.

* cited by examiner

MODULAR SENSOR ASSEMBLY INCLUDING REMOVABLE SENSING MODULE

FIELD

The present disclosure relates generally to sensors, and more particularly, to modular sensor assemblies.

BACKGROUND

Sensors are commonly used to sense various parameters in a wide variety of applications including, for example, medical applications, flight control applications, industrial process applications, combustion control applications, weather monitoring applications, as well as many other applications. In some applications, it may be desirable to replace the sensors periodically or at other times. Particularly in these applications, the cost of such sensors can be important.

SUMMARY

The present disclosure relates generally to sensors, and more particularly, to modular sensor assemblies that include, for example, a removable and/or disposable sensing module including a transducer or sensor. In one illustrative embodiment, a modular sensor assembly includes a signal processing module and a sensing module. The signal processing module may be configured to be connected to an end-user device, and may be configured to produce a conditioned (e.g. linearized) sensor output signal from a raw or partially conditioned output signal received from the sensing module. In some instances, the signal processing module may include a signal conditioning block.

The sensing module may be configured to produce a raw or partially conditioned output signal, and may be housed separately from the signal processing module. The sensing module may be electrically coupled to the signal processing module via a wired (or wireless) connection. In some cases, the sensing module may be removably mechanically coupled to the signal processing module. For example, the sensing module may include a housing that forms a first part of a connector, and the signal processing module may include a housing that forms a second complementary part of the connector. In some instances, the first part of the connector may interface with the second complementary part of the connector to removably mechanically couple the housing of the sensing module to the housing of the signal processing module. In some cases, such a connector may also include two or more electrical interconnects which may form an electrical connection between the sensing module and the signal processing module when the first part of the connector is mechanically connected to the second complementary part of the connector.

In some instances, the sensing module may include at least one transducer or sensor for sensing a physical parameter, and in some cases, a local memory configured to retain a set of correction coefficients specific to the at least one transducer or sensor. When so provided, the signal conditioning block of the signal conditioning module may be configured to download some or all of the correction coefficients stored in the local memory of the sensing module, and utilize the downloaded correction coefficients to produce the conditioned output signal from the raw or partially conditioned output signal. After use, the sensing module may be disconnected mechanically, electrically, or both from the signal processing module for replacement and/or disposal.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
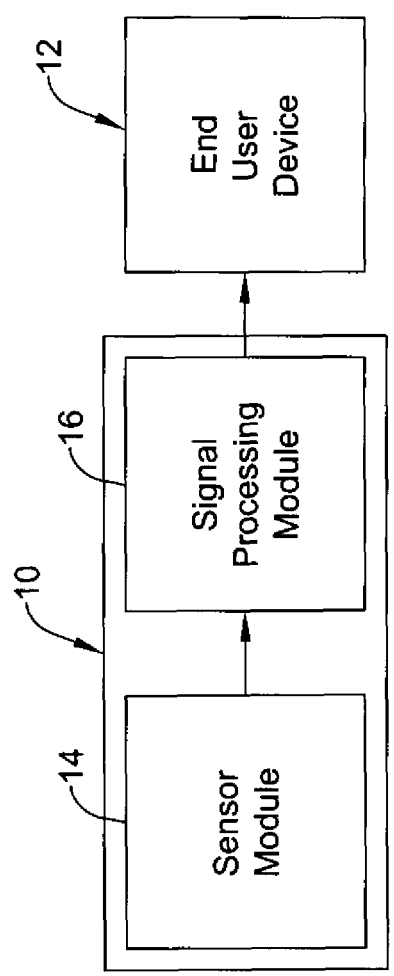
FIG. 1 is a schematic block diagram of an illustrative modular sensor assembly coupled to an end-user device.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the claimed disclosure.

For merely illustrative purposes, the present disclosure has been described with reference to some relative terms including, for example, left, right, top, bottom, front, back, upper, lower, up, and down, as well as others. It is to be understood that these terms are merely used for illustrative purposes and are not meant to be limiting in any manner.

Also, while not so limited, the modular sensor assembly, as described herein according to the various illustrative examples, may be particularly suitable for those applications where a sensor may be exposed to a "dirty" or "contaminated" environment, and those that require that the sensor be either sterilized or disposed of after use such as some medical applications. The modular sensor assembly, as described herein, may provide a modular assembly in which the sensing module may be packaged and provided separately from the signal processing module, which may facilitate disposal and/or replacement of the sensing module after exposure to a "dirty" or "contaminated" environment without requiring disposal and/or replacement of the entire assembly.

FIG. 1 is a schematic block diagram of an illustrative modular sensor assembly 10 shown coupled to an end-user device 12. The modular sensor assembly 10 may measure a fluid flow rate and/or sense another physical parameter such as, for example, pressure, temperature, humidity, and the like. In medical applications, exemplary end-user devices may include, but are not limited to, respirometers, ventilators, spirometers, oxygen concentrators, spectrometry applications, sleep apnea machines, nebulizers, anesthesia delivery machines, and other medical applications. Additional exemplary applications for the illustrative modular sensor assembly 10 may include, but are not limited to, flight control applications, industrial applications (e.g., air-to-fuel ratio, spectrometry, fuel cells, gas leak detection, gas meters, HVAC applications), gas chromatography applications, combustion control applications, weather monitoring applications, as well as any other suitable application.

In the illustrative embodiment depicted in FIG. 1, the modular sensor assembly 10 includes a sensing module 14 removably coupled to a signal processing module 16. In many embodiments, the sensing module 14 may be packaged and housed in a housing that is separate from the housing of the signal processing module 16. Additionally, in some embodiments, the sensing module 14 may be removably coupled to the signal processing module 16 such that the sensing module 14 may be removed and/or disposed of after use. In other embodiments, the sensing module 14 may be in wireless communication with the signal processing module 16 via a wireless communication link such that it can be located separately and/or remotely from the signal processing module 16.

FIGS. 2A-2D are schematic block diagrams of sensing modules 14A-14D in accordance with various illustrative embodiments. As illustrated in FIGS. 2A-2D, each of the sensing modules 14A-14D, according to the various illustrative embodiments as described herein, include at least one transducer or sensor 18. Transducers are "elements" that sense a physical parameter but are not compensated while sensors are either full or partially compensated for some other variable parameter. The transducer or sensor 18 may be any suitable transducer or sensor. Exemplary sensors include, but are not limited to, flow sensors, pressure sensors, humidity sensors, temperature sensors, chemical sensors, pH sensors, and the like. In some applications, the sensing modules 14A-14D, as described herein and according to the various illustrative embodiments, may include more than one transducer or sensor 18. In embodiments where multiple transducers and/or sensors 18 are utilized, the transducers and/or sensors 18 may be of the same or differing types. A sensing module containing multiple sensors of differing types may be referred to as a combination sensing module or a "combi sensor" module. For example, in certain embodiments, a sensing module may include a flow sensor and a pressure sensor, or a flow sensor and a temperature sensor.

In certain embodiments, the transducer or sensor 18 may be a flow sensor for measuring a fluid flow rate passing through a fluid channel including a fluid inlet and a fluid outlet. Depending upon the application, the fluid channel may be a main flow channel or a bypass flow channel. The flow sensor may be capable of sensing fluid flow at different fluid flow rates, which may include a high-volume fluid flow, a mid-volume fluid flow, or a low volume fluid flow. The flow sensor may be exposed to and/or disposed in fluid communication with a fluid channel to measure one or more properties of the fluid flow. For example, the flow sensor may measure the mass flow and/or velocity of the fluid flow using one or more thermal sensors (e.g., see FIG. 3), pressure sensors, acoustical sensors, optical sensors, pitot tubes, and/or any other suitable sensor or sensor combination, as desired. In some applications, the flow sensor 18 may be a microbridge or a Microbrick™ sensor assembly (e.g., see FIG. 4) available from the assignee of the present application, but this is not required. Some illustrative methods and sensor configurations that are considered suitable for measuring the mass flow and/or velocity of the fluid flow are disclosed in, for example, U.S. Pat. Nos. 4,478,076; 4,478,077; 4,501,144; 4,581,928; 4,651,564; 4,683,159; 5,050,429; 6,169,965; 6,223,593; 6,234,016; 6,502,459; 7,278,309; 7,513,149; and 7,647,842. It is contemplated that the flow sensor may include any of these flow sensor configurations and methods, as desired. It must be recognized, however, that the flow sensor may be any suitable flow sensor.

Figure 3:
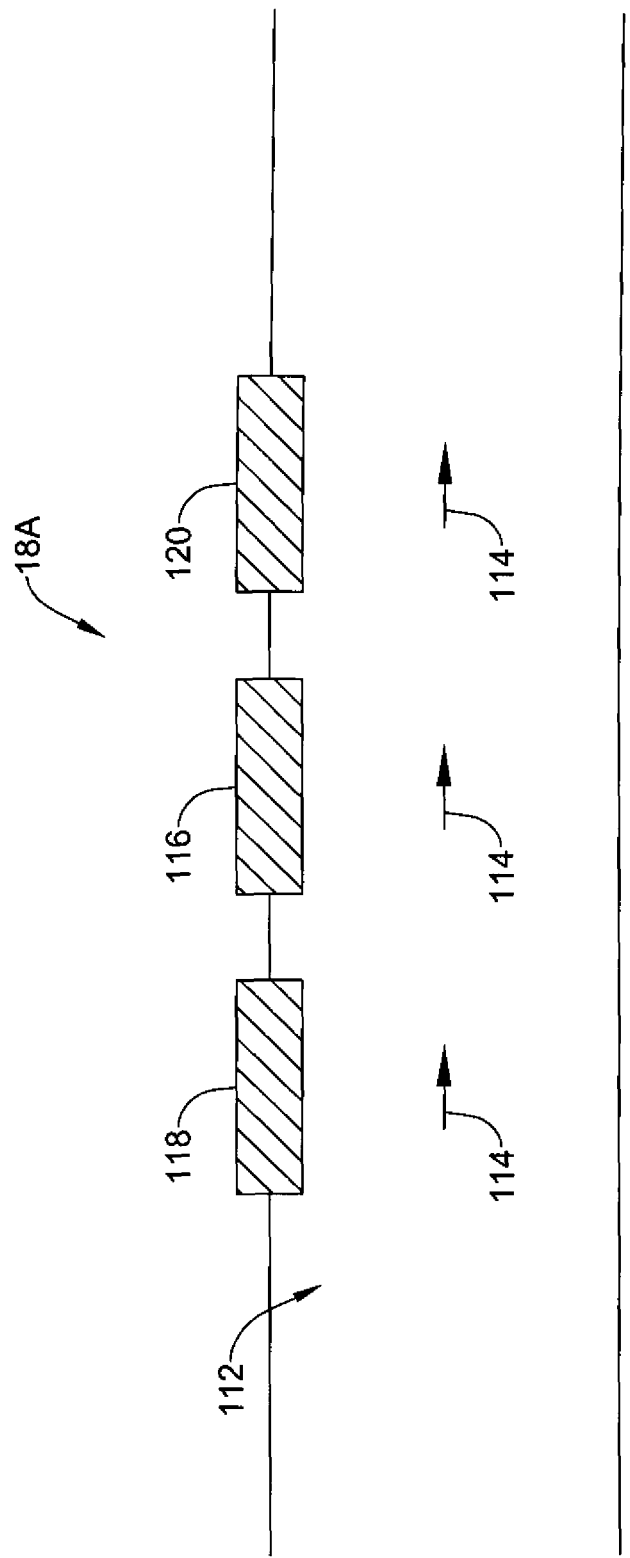
FIG. 3 is a schematic diagram of an illustrative thermal flow sensor assembly for measuring the flow rate of a fluid passing through a fluid channel.
Figure 4:
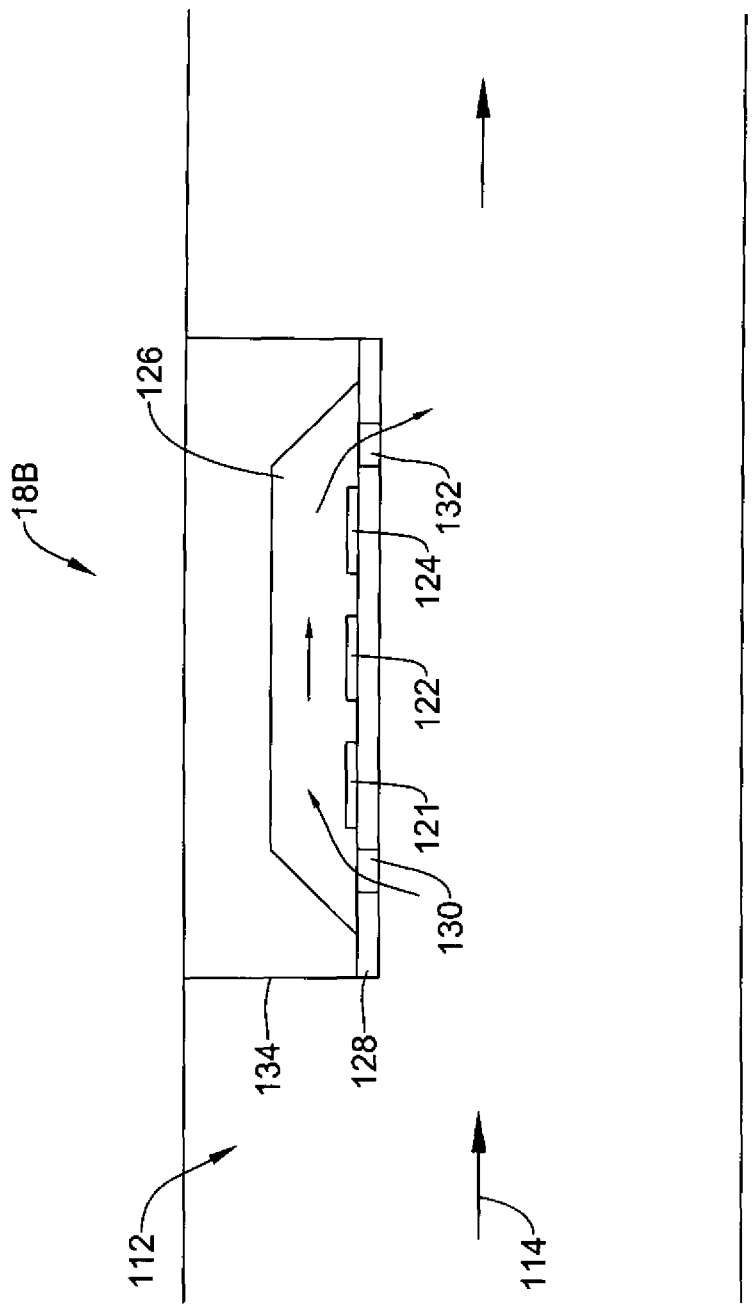
FIG. 4 is a schematic diagram of an illustrative thermal flow sensor assembly for measuring the flow rate of a fluid passing through a fluid channel.

FIGS. 3 and 4 are schematic diagrams of illustrative sensors 18A and 18B that may be suitable for use in the sensing modules 14A-14D, as described herein. FIG. 3 is a schematic diagram of an illustrative thermal flow sensor 18A for measuring the flow rate of a fluid flow 114 passing through a fluid channel 112. The term "fluid" as used herein can refer to a gas flow or a liquid flow, depending on the application. In the illustrative embodiment of FIG. 3, the flow sensor 18A includes one or more heater elements, such as heater element 116, and one or more sensor elements 118 and 120, for sensing a flow rate of a fluid flow 114 in the fluid channel 112. As shown in FIG. 3, a first sensor element 118 can be positioned upstream of the heater element 116, and a second sensor element 120 can be positioned downstream of the heater element 116. However, this is not meant to be limiting and it is contemplated that, in some embodiments, the fluid channel 112 may be a bi-directional fluid channel such that, in some cases, the first sensor element 118 is downstream of the heater element 116 and the second sensor element 120 is upstream of the heater element 116. In some instances, only one sensor element may be provided, and in other embodiments, three or more sensor elements may be provided. In some instances, both sensor elements 118 and 120 may be positioned upstream (or downstream) of the heater element 116.

In some cases, the first sensor element 118 and the second sensor element 120 may be thermally sensitive resistors that have a relatively large positive or negative temperature coefficient, such that the resistance varies with temperature. In some cases, the first and second sensing elements 118 and 120 may be thermistors. In some instances, the first sensor element 118, the second sensor element 120, and any additional sensor elements may be arranged in a Wheatstone bridge configuration, but this is not required. The output of the Wheatstone bridge may provide a measure of the sensed property of the fluid, and may be considered to be a raw output signal. In some cases, the output of the Wheatstone bridge may pass through a pre-amplifier, and may still be considered a raw output signal. Often, such a raw output signal will not be linear across the entire sensed range of the sensed property, particularly over all operating conditions.

In the example shown, when no fluid flow is present in the fluid channel 112 and the heater element 116 is heated to a temperature higher than the ambient temperature of the fluid in the fluid flow 114, a temperature distribution may be created and transmitted in a generally symmetrical distribution about the heater element 116 to upstream sensor element 118 and downstream sensor element 120. In this example, upstream sensor element 118 and downstream sensor element 120 may sense the same or similar temperature (e.g., within 25 percent, 10 percent, 5 percent, 1 percent, 0.001 percent, etc.). In some cases, this may produce the same or similar output voltage in the first sensor element 118 and the second sensor element 120. When a non-zero fluid flow 114 is present in the fluid channel 112 and the heater element 116 is heated to a temperature higher than the ambient temperature of the fluid in the fluid flow 114, the symmetrical temperature distribution may be disturbed and the amount of disturbance may be related to the flow rate of the fluid flow 114 in the fluid channel 112. The flow rate of the fluid flow 114 may cause the upstream sensor element 118 to sense a relatively cooler temperature than the downstream sensor element 120. In other words, the flow rate of the fluid flow 114 may cause a temperature differential between the upstream sensor element 118 and the downstream sensor element 120 that is related to the flow rate of the fluid flow 114 in the fluid channel 112. The temperature differential between the upstream sensor element 118 and the downstream sensor element 120 may result in an output voltage differential between the upstream sensor element 118 and the downstream sensor element 120.

In another illustrative embodiment, the mass flow and/or velocity of the fluid flow 114 may be determined by providing a transient elevated temperature condition in the heater element 116, which in turn causes a transient elevated temperature condition (e.g., heat pulse) in the fluid flow 114. When there is a non-zero flow rate in the fluid flow 114, the upstream sensor element 118 may receive a transient response later than the downstream sensor element 120. The flow rate of the fluid flow 114 can then be computed using the time lag between the upstream sensor element 118 and downstream sensor element 120, or between the time the heater is energized and when the corresponding elevated temperature condition (e.g., heat pulse) is sensed by one of the sensors, such as the downstream sensor 120.

FIG. 4 is a schematic diagram of another illustrative thermal flow sensor 18B for measuring the flow rate of a fluid flow 114 passing through a fluid channel 112. In some cases, thermal flow sensor 18B may be a manifestation of the flow sensor assembly shown in FIG. 3. As shown in FIG. 4, the flow sensor 18B may be a thermal flow sensor (such as, for example, a microbridge flow sensor, a thermal anemometer sensor, a MEMS-based sensor, etc.) for measuring the flow rate of a fluid flow 114 passing through a fluid channel 112. In the illustrative embodiment, the flow sensor 18B includes a substrate 134 defining a sensor channel 126 for receiving at least some of the fluid flowing through fluid channel 112. In some embodiments, the substrate 134 may be a silicon substrate or other substrate, as desired. A layer 128 may be formed on or in the substrate, which may support one or more heater elements, such as heater element 122, and one or more sensor elements, such as sensor elements 121 and 124, for sensing a flow rate of a fluid flow 114 in the channel 126. As illustrated, layer 128 may be fabricated to include openings 130 and 132 for fluidly connecting the sensor channel 126 to the fluid channel 112. In other implementations, the heater element(s) and sensor elements may be disposed directly on a wall of the fluid channel 112 (or on another substrate that is disposed directly on the wall of the fluid channel 112), without an additional sensor channel 126. When a fluid flow is present in fluid channel 112, at least some of the fluid flow 114 may flow through opening 130 into the sensor channel 126, across one or more heater elements, such as heater element 122, and one or more sensing elements, such as sensing elements 121 and 124, and through an opening 132 back into the fluid channel 112.

Referring now back to FIGS. 2A-2D, according to various illustrative embodiments, each of the sensing modules 14A-14D may include at least one transducer or sensor 18 mounted to or disposed within a sensor housing 22. The sensor housing 22 facilitates exposure of the transducer or sensor(s) 18 to the surrounding physical environment. For example, in some instances, the housing 22 may define a fluid inlet port 24 for delivery of a fluid to the sensor(s) 18. The housing 22 may also optionally define a fluid outlet 25 in addition to the fluid inlet, depending upon the configuration of the transducer or sensor 18. The sensor housing 22 may be formed from a single part (e.g., single molded part) and may optionally include a cover (not shown). The housing 22 and the cover may be formed from a composite material or may be molded in a single piece from a plastic, ceramic, metal, or any other suitable material according to design considerations. It is also contemplated that the housing 22 may be formed by injection molding or may be made by any other suitable methods and materials, as desired. In some applications, the housing 22 may include a printed circuit board or any other suitable substrate for mounting the transducer or sensor 18 thereon. In some instances, the sensor housing 22 may be attached to a substrate using a suitable adhesive or any other suitable bonding technique.

Each of the sensing modules 14A-14D may include an electrical interconnect 26 for electrically interfacing the sensing modules 14A-14D with a signal processing module 16 (FIG. 1 and/or FIG. 5) or other processing module, as will be described in greater detail below. In some cases, the electrical interconnect 26 is configured to electrically interface the sensing module 14A-14D with a signal processing module 16 and/or end-user device. For example, the electrical interconnect 26 may facilitate the transfer of data stored within a local memory device 30 (when provided) coupled to the at least one transducer or sensor 18 to the signal processing module 16 as well as the modular sensor assembly 10 output signal. In certain embodiments, the electrical interconnect 26 may be capable of also supplying power and/or other necessary excitation to the sensing module 14A, 14B, 14C, or 14D. By providing a mechanical (or wireless) interface between the sensing module 14A-14D and the signal processing module 16, the electrical interconnect 26 may make it possible to removably mechanically couple the sensing module 14A-14D to the signal processing module 16 such that the sensing module 14A-14D can be removed for disposal and/or exchange for a new or different type of sensing module. Providing a sensing module 14A-14D that is removably coupleable to a signal processing module 16 may avoid disposal of the signal processing module 16 after use and, as such, may provide a cost saving to the user.

In certain embodiments, the electrical interconnect 26 may be configured to interface both electrically and mechanically with a corresponding electrical interconnect 56 (see e.g., FIG. 5) located on the signal processing module 16. The electrical interconnect 26 may be configured to mechanically interface directly with a corresponding electrical interconnect 56 (FIG. 5) located on the signal processing module 16, or may be coupled to the electric interconnect 56 located on the signal processing module 16 via a wire or cable. In some instances, the electrical interconnect 26 on the sensing module 14A-14D may contain software or programming code such that it is configured to "plug-and-play" when coupled with the signal processing module 16. In one example, the sensing module 14 may include a housing 22 that forms a first part 26 of a connector, and the signal processing module 16 may include a housing 50 that forms a second complementary part 56 of the connector. When so provided, the first part 26 of the connector may interface with the second complementary part 56 of the connector to removably mechanically couple the housing 22 of the sensing module 14A-14D to the housing 50 of the signal processing module 16. In some cases, such a connector may also include two or more electrical interconnects which may form an electrical connection between the sensing module 14A-14D and the signal processing module 16 when the first part 26 of the connector is mechanically connected to the second complementary part 56 of the connector. Exemplary connectors, suitable for both the sensing module 14A-14D and the signal processing module 16, may be similar to plug and socket connectors, 8P8C connectors (Ethernet port connectors), D-subminiature (D-sub) connectors, USB connectors, ribbon connectors, micro-ribbon or miniature ribbon connectors, and the like. Depending upon the type of connector utilized, the connector may include a corresponding cable type suitable for that connector type. For example, if the electrical interconnect includes a USB connector, it may also include a USB cable for electrically interfacing with a corresponding USB connector located on the signal processing module 16, but this is not required.

In still other illustrative embodiments, the electrical interconnect 26 may be a wireless transmitter/receiver configured to wirelessly transmit and receive data to and from the signal processing module 16. A wireless electrical interconnect may facilitate remote location of the sensing module 14A-14D from the signal processing module 16, but this is not required.

Figure 2A:
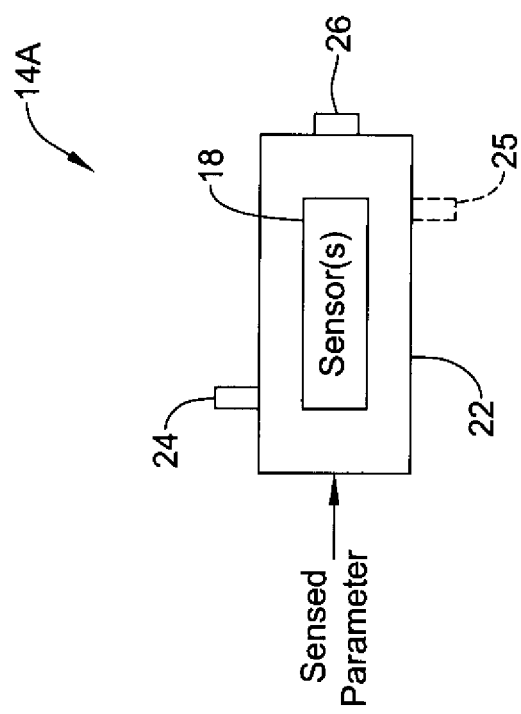
FIGS. 2A-2D are schematic block diagrams of illustrative sensing modules.
Figure 2B:
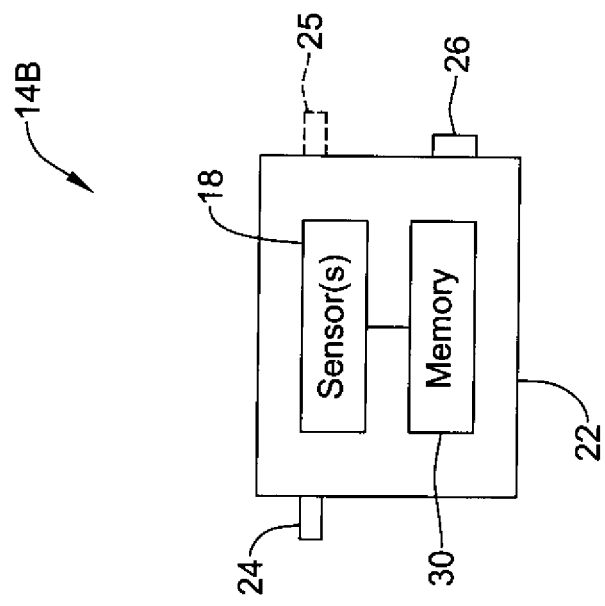
Figure 2C:
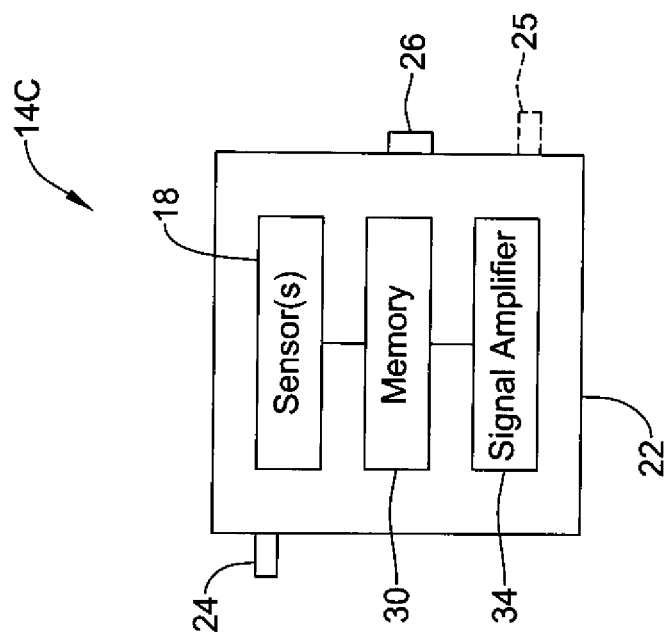
Figure 2D:
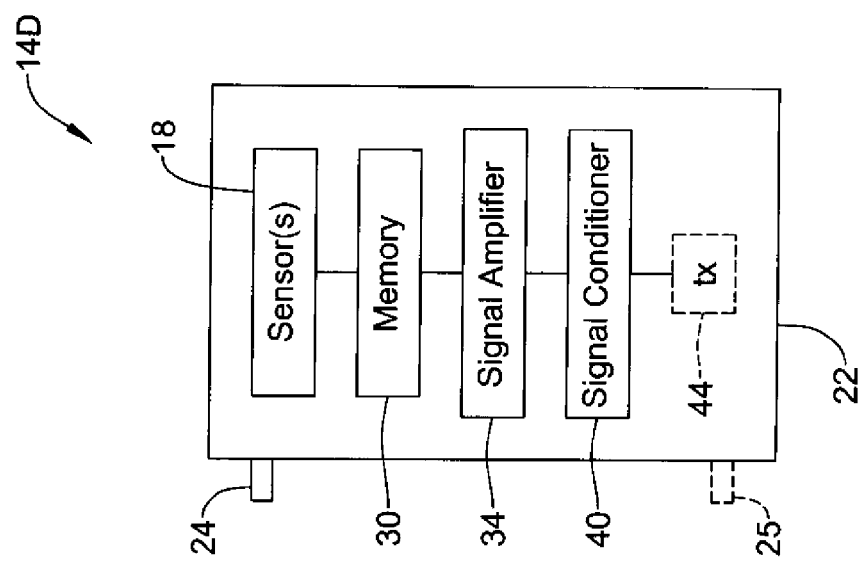

In further illustrative embodiments, as shown in FIGS. 2B-2D, a sensing module 14B may include at least one transducer or sensor 18 and a local memory device 30 for locally storing information and data relevant for the transducer(s) or sensor(s) 18. While any suitable memory may be used for the memory device 30, in many instances the memory device 30 may be a re-writable, non-volatile memory device such as an EEPROM (electronically erasable programmable read only memory) or a flash memory device (e.g. flash EPROM). It will be generally recognized that other writable memory devices may be used. In some cases, the memory device 30 may be a ROM, RAM or any other suitable memory device.

In certain embodiments, the local memory device 30 may be configured with conditioning coefficients and/or other data specific to the transducer and/or sensor(s) 18 contained within the sensing module 14B-14D. This data, including the conditioning coefficients, may be transferred via the electrical interconnect (or a wireless communication link) to the signal processing module 16 (FIG. 5 or FIGS. 6A-6B) which may contain a processor, microprocessor or other circuitry for processing the sensing module 14A-14D output signal. The signal processing module 16 may use the conditioning coefficients and/or other data transferred from the local memory device 30 to process the raw or partially conditioned output signal from the transducer and/or sensor(s) 18 into a partially conditioned or fully conditioned output signal. While the conditioned output signal may be, in some cases, a substantially linearized output signal, it will be recognized that the conditioned output signal may have a shape that may represent another mathematical relationship other than linear.

The local memory device 30 may be configured to store up to the maximum number of coefficients needed to process the raw or partially conditioned output signal to produce a desired conditioned output signal. In some cases, a partially or fully conditioned output signal may have: a prescribed deviation (% FSS) of less than about 0.1% from an ideal conditioned output signal over the full scan span; a prescribed deviation (% FSS) of less than about 0.25% from an ideal conditioned output signal over the full scale span; a prescribed deviation (% FSS) of less than about 1% from an ideal conditioned output signal over the full scale span, a prescribed deviation (% FSS) of less than about 2% from an ideal conditioned output signal over the full scale span; or a prescribed deviation (% FSS) of less than about 5% from an ideal conditioned output signal over the full scale span. In other cases, the partially or fully conditioned output signal may have a prescribed deviation of less than about 2.5% of the reading or absolute measurement (% Reading).

In certain embodiments, the local memory device 30 may be configured to store up to 13 (or more) conditioning coefficients. The conditioning coefficients stored within the local memory device 30 may be calibrated such that they are specific to that particular sensing module 14A-14D. Because the conditioning coefficients are specific to the sensing module, it may be feasible to realize very high accuracy without the need to calibrate the sensing module 14A-14-D to a specific signal processing module 16 and/or end user device 12.

Figure 5:
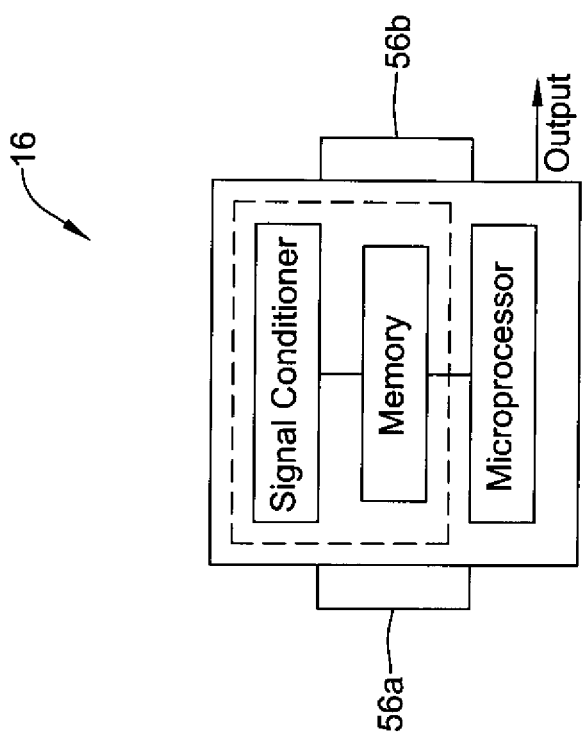
FIGS. 5 and 6A-6B are schematic block diagrams of illustrative signal processing modules.
Figure 6A:
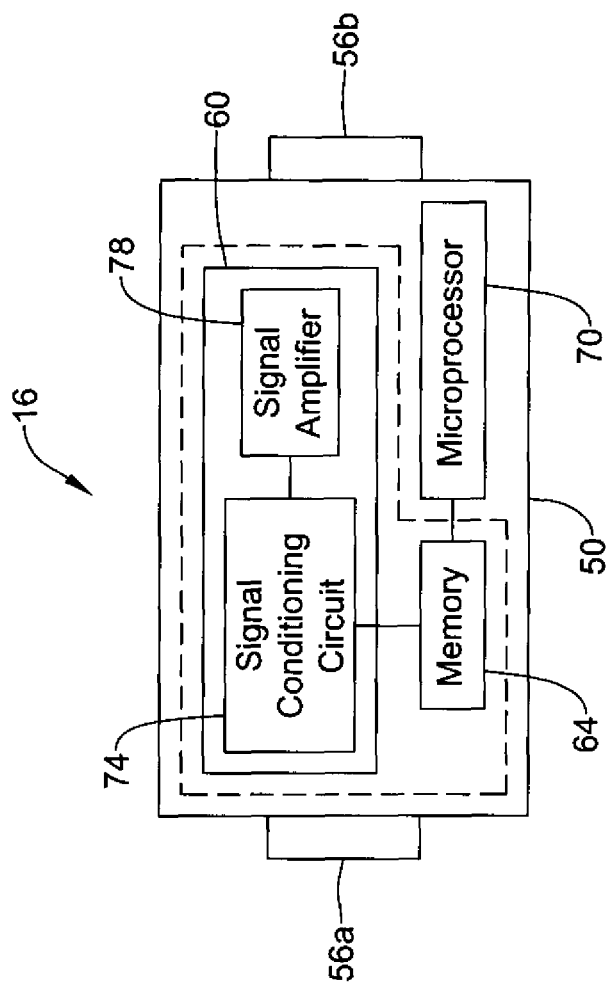
Figure 6B:
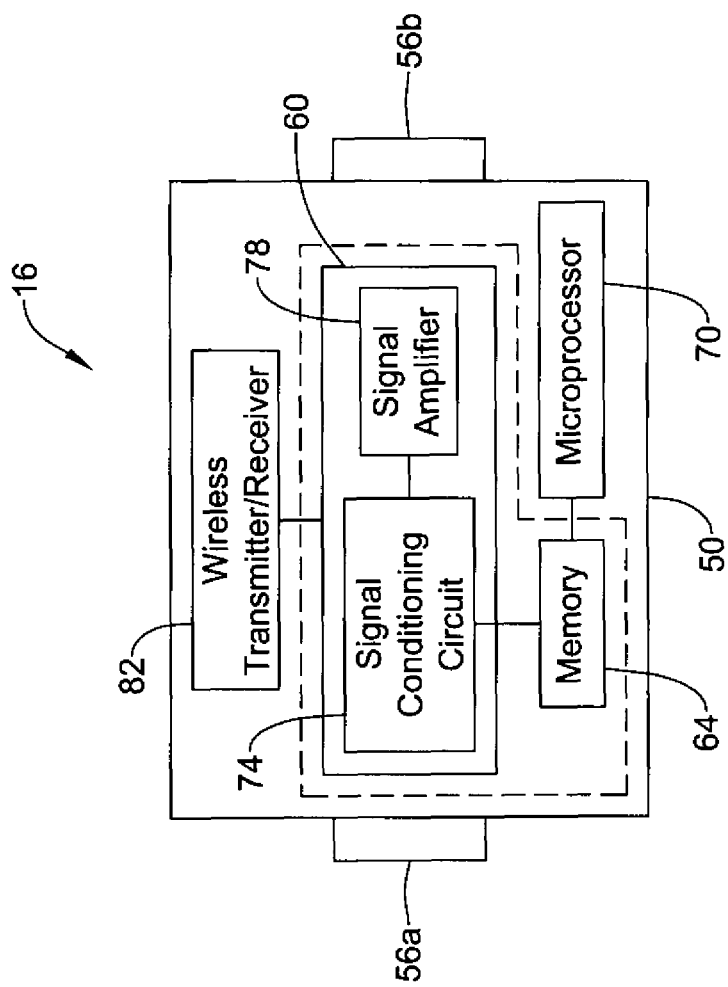

In other illustrative embodiments, as shown in FIGS. 2C-2D, a sensing module 14C or 14D may also include a signal amplifier 34 (e.g. pre-amplifier) for amplifying a signal received from the transducer(s) or sensor(s) 18. Depending on the gain of the signal amplifier 34, signal amplification may increase the resolution of the output signal and/or may increase the signal-to-noise ratio of the output signal. Exemplary signal amplifiers include, but are not limited to, sample and hold amplifiers, log amplifiers, antilog amplifiers, instrumentation amplifiers, programmable gain amplifiers, and the like. The type of signal amplifier may be selected based on the type of transducer(s) or sensor(s) 18 utilized in sensing modules 14C-14D and/or the amount of signal amplification and/or signal-to-noise ratio needed before the sensing module output signal is processed by the signal processing module 16 (FIGS. 5 and 6A-6B). The transducer(s) or sensor(s) output signals from the illustrative sensing modules 14B or 14D shown in FIGS. 2B and 2D may be considered raw sensing module output signals.

In yet another illustrative embodiment, as shown in FIG. 2D, a sensing module 14D may also include a signal conditioner 40. The signal conditioner may include signal amplifiers, signal filters, signal converts, range matching circuitry, isolation circuitry and/or any other circuitry that is configured to at least partially condition the sensor output signal such that it is suitable for further processing by the sensor processing module 16 (FIGS. 5 and 6A-6B). In embodiments where the signal conditioner 40 may include a signal amplifier, a separate signal amplifier may not be required. In one embodiment, the signal conditioner 40 may include a signal converter for converting the output signal from analog to digital. The sensing module 14D may optionally include a wireless transmitter/receiver 44 for wirelessly transmitting and/or receiving data from the sensing module 14D to a signal processing module 16 or other processor.

In some instances, the signal conditioner 40 may reference some conditioning coefficients from memory 30, and may perform some pre-conditioning of the raw output signal. This pre-conditioning can help compensate the raw output signal for certain other parameters, such as temperature effects, supply voltage variations, and the like. The raw output signals from the illustrative sensing module shown in FIG. 2D may be considered a partially conditioned output signal.

While the illustrative embodiments depicted in FIGS. 2A-2D show exemplary configurations for sensing modules 14A-14D, it must be recognized that the sensing modules 14A-14D, as described herein according to the various illustrative embodiments, may include a different number and combination of the various sensing module components (e.g., local memory, signal amplifier, signal conditioner, wireless transmitter, and the like), as described herein, depending on the desired application. For example, in one embodiment, an illustrative sensing module may include a transducer or sensor 18, local memory 30 including the required conditioning coefficients for facilitating compensation of the output signal stored therein, and a wireless transmitter/receiver 44 for wirelessly transmitting an output signal to the signal processing module.

FIGS. 5 and 6A-6B are schematic block diagrams of an illustrative signal processing module 16 in accordance with various illustrative embodiments. The signal processing module 16 may be configured to output a conditioned (e.g., linearized) signal to an end-user device 12 (e.g., personal computer, patient monitoring device, hand-held device, and the like) for further analysis. The signal processing module 16 may include a housing 50 and may be coupled to any one of the exemplary sensing modules 14A-14D via a first electrical interconnect 56a. A second electrical interconnect 56b may be used to electrically couple the signal processing module 16 to the end user device 12 (FIG. 1). The housing 50 may be formed from a single part (e.g., single molded part) and may optionally include a protective cover (not shown). The housing 50 and the protective cover may be formed from a composite material or may be molded in a single piece from a plastic, ceramic, metal, or any other suitable material according to design considerations. In some applications, the housing 22 may include a printed circuit board or any other suitable substrate for electrically mounting the signal conditioning block 60, memory 64, and microprocessor 70. In other applications, the housing 50 may be attached to a substrate using a suitable adhesive or any other suitable bonding technique.

The first electrical interconnect 56a may be configured to interact with the electrical interconnect 26 provided on a sensor processing module 14A-14D. In some embodiments, the electrical interconnect 56a may be configured to interface both electrically and mechanically with a corresponding electrical interconnect 26 (see e.g., FIGS. 2A-2D) located on the signal processing module 16. For example, the electrical interconnect 56a may be configured to interface directly with a corresponding electrical interconnect 26 located on a sensing module 14A-14D in a cooperating manner or may be coupled to the electrical interconnect 26 located on a sensing module 14A-14D via a wire or cable. As described above, exemplary connectors, suitable for both the sensing module 14A-14D and the signal processing module 16, may be similar to plug and socket connectors, 8P8C connectors (Ethernet port connectors), D-subminiature (D-sub) connectors, USB connectors, ribbon connectors, micro-ribbon or miniature ribbon connectors, and the like. Depending upon the type of connector utilized, the connector may include a corresponding cable type suitable for that connector type. For example, if the electrical interconnect includes a USB connector, it may also include a USB cable for electrically interfacing with a corresponding USB connector located on the signal processing module 16, but this is not required.

In still other illustrative embodiments, the first electrical interconnect 56a may include a wireless transmitter/receiver configured to wirelessly transmit and receive data to and from a sensing module 14A-14D. Additionally, a wireless electrical interconnect may facilitate remote location of the sensing module 14A-14D from the signal processing module 16.

The signal processing module 16 may be electrically coupled to an end-user device 12 (FIG. 1) using a second electrical interconnect 56b. Like the first electrical interconnect 56a, the second electrical interconnect 56b may be configured to interface directly with a corresponding electrical interconnect located on an end-user device 12 in a cooperating manner or may be coupled to the end-user device 12 via a wire or cable. Suitable exemplary electrical interconnects are described above.

As illustrated in FIG. 6A, the signal processing module 16 may include a signal conditioning block 60. According to various illustrative embodiments, the signal conditioning block 60 may be used to process a raw or partially conditioned output signal received from the sensing module 14A-14D into a conditioned (e.g., linearized) modular sensor assembly output signal. The signal conditioning block 60 may contain suitable signal conditioning circuitry 74, memory 64, and a microprocessor 70. In certain embodiments, the signal conditioning block 60 and the memory 64 together may form part of an application specific integrated circuit or ASIC. However, it will be generally understood that the signal conditioning block 60 and memory 64 may also be configured in a general purpose integrated circuit, or may be provided as separate elements, as desired. While any suitable memory may be used, in many instances the memory 64 may be a re-writable, non-volatile memory device such as an EEPROM (electronically erasable programmable read only memory) or a flash memory device (e.g., flash EPROM). It will be generally recognized that other writable memory devices may be used. In some cases, the memory device 64 may be a ROM, RAM or any other suitable memory device.

In certain embodiments, as illustrated in FIGS. 6A and 6B, the signal conditioning block 60 may contain a signal conditioning circuit 74 which may be programmed with an algorithm for processing the raw or partially conditioned output signal received from the sensing module into a conditioned (e.g., substantially linearized) output signal using a higher-order polynomial equation such as, for example, a Fourier Transform. Additionally, the signal conditioning circuit 74 contained within the signal conditioning block 60 may be programmed to download the conditioning coefficients specific to the transducer(s) or sensor(s) 18 stored in the local memory 30 of the sensing module 14, and to use those conditioning coefficients to produce a highly accurate, substantially linearized output signal indicative of the parameter being sensed.

In certain embodiments, the memory 64 may contain a set of generic conditioning coefficients that may be usable with a range of end-user devices and/or sensing modules. When so provided, the signal conditioning circuit 74 may then use the conditioning coefficients downloaded from the sensing module 14 as well as the generic conditioning coefficients from memory 64 to process the raw or partially conditioned output signal received from the sensing module into a conditioned (e.g. substantially linearized) output signal.

The signal conditioning block 60 may also include a signal amplifier 78 (FIGS. 6A and 6B) to facilitate processing of the output signal received from the signal processing module 14A-14D, and to drive the conditioned output signal to the end-user device 12. In some cases, signal amplification may increase the resolution of the conditioned output signal and/or may increase the signal-to-noise ratio of the output signal. Exemplary signal amplifiers include, but are not limited to, sample and hold amplifiers, log amplifiers, antilog amplifiers, instrumentation amplifiers, programmable gain amplifiers, and the like. The type of signal amplifier may be selected based on the application at hand.

The signal conditioning block 60 may also include other circuitry to facilitate processing of the output signal received from the signal processing module 14A-14D. Exemplary circuitry for facilitating signal processing and conditioning includes, but is not limited to, signal filters, signal converters (e.g. A/D Converters), range matching circuitry, isolation circuitry or any other circuitry that is configured to condition the output signal such that it is suitable for processing by the signal processing module 16 and/or end-user device 12. The signal processing module 16 may also optionally include a wireless transmitter/receiver 82 (FIG. 6B) for wirelessly transmitting and/or receiving data from a sensing module such as, for example, any one of sensing modules 14A-14D and/or an end-user device 12.

While the illustrative embodiments depicted in FIGS. 5 and 6A-6B show exemplary configurations for a signal processing module 16, it must be recognized that the signal processing module 16, as described herein according to the various illustrative embodiments, may include a different number and combination of various components and circuitry, as described herein, for processing a raw or partially conditioned output signal received from any one of exemplary sensing modules 14A-14D, depending on the desired application.

Once the output signal has been processed by the signal processing module 16, the data may be stored in the memory 64 and/or transferred to an end-user device 12 (e.g., personal computer, patient monitoring device, hand-held device, and the like) for display to the end-user and/or further analysis.

Figure 7:
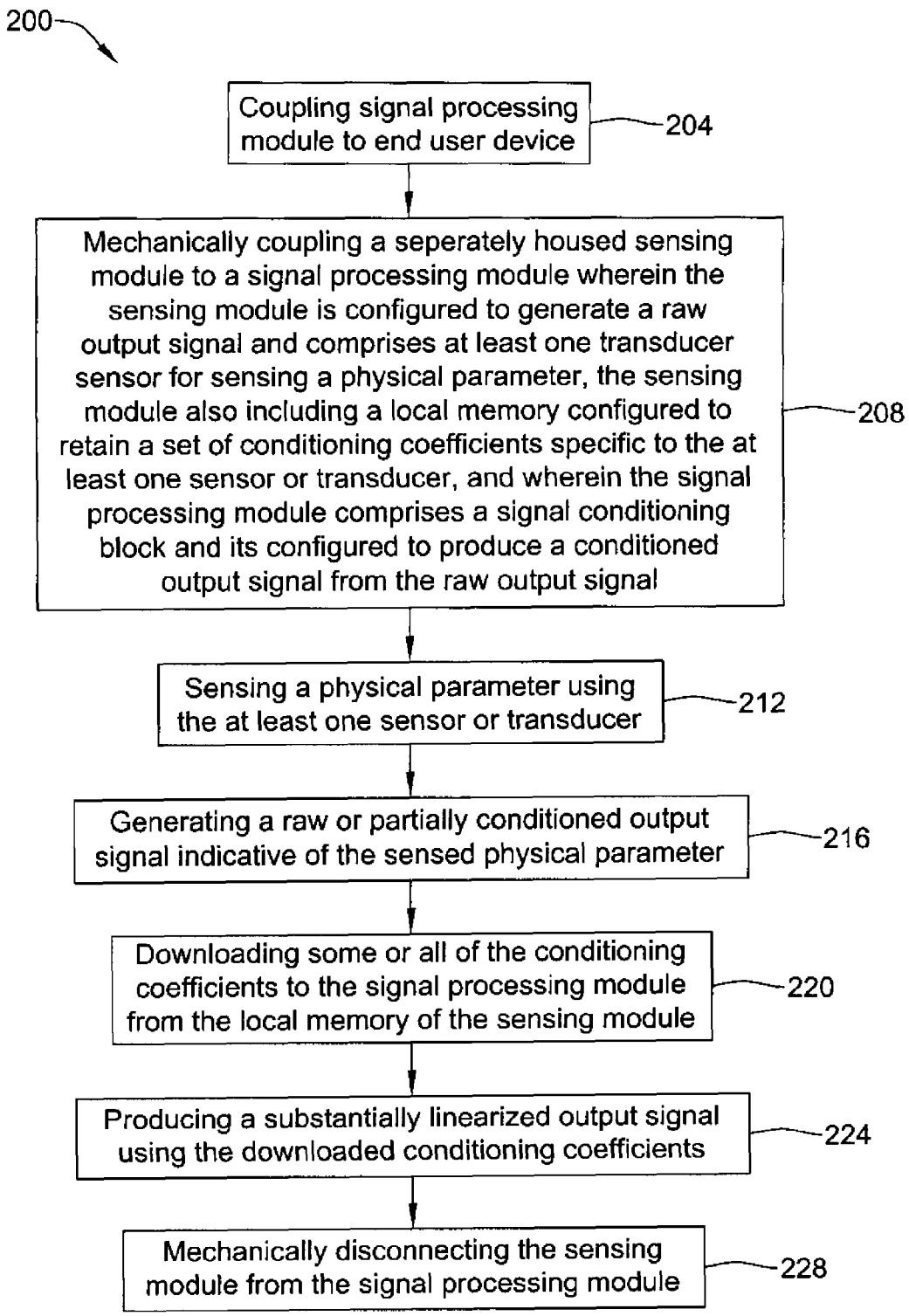
FIG. 7 is a flow chart of an illustrative method of using a modular sensor assembly.

FIG. 7 is a flow chart of a method 200 of using a modular sensor assembly, as described herein according to various illustrative embodiments. First, a signal processing module may be coupled to an end-user device (Block 204). Next, a separately provided sensing module may be selected and then coupled to the signal processing module (Block 208). In certain embodiments, the sensing module is removably and mechanically coupled to the signal processing module such that the sensing module can be disposed of or replaced after use. The sensing module may be coupled directly to the signal processing module or may be remotely located from the signal processing module and coupled to the signal processing module via a wired or wireless communication link. Once the sensing module has been coupled to the signal processing module, the sensing module may sense a physical parameter, and may generate a raw or partially conditioned output signal indicative of the sensed physical parameter (Blocks 212 and 216). Some or all of conditioning coefficients stored in a memory of the sensing module may be downloaded to the signal processing module when the sensing module is mechanically coupled to the signal processing module (Block 220). The signal processing module may then produce a conditioned output signal using the downloaded conditioning coefficients (Block 224). Finally, the sensing module may be mechanically disconnected from the signal processing module (Block 228). In some cases, the sensing module is disposed of once it is mechanically disconnected from the signal processing module, but this is not required.

Having thus described various illustrative embodiments of the present disclosure, those of skill in the art will readily appreciate that yet other embodiments may be made and used within the scope of the claims hereto attached. Changes may be made in details, particularly in matters of shape, size, and arrangement of parts without exceeding the scope of the disclosure. The disclosure's scope is, of course, defined in the language in which the appended claims are expressed.

What is claimed is:

1. A modular sensor assembly, comprising:
 a signal processing module configured to be connected to an end-user device and configured to produce a conditioned output signal from a raw or partially conditioned output signal, the signal processing module comprising a signal conditioning block;
 a sensing module housed separately from and removably mechanically coupled to the signal processing module, the sensing module comprising at least one transducer or sensor for sensing a physical parameter and a local memory configured to retain a set of conditioning coefficients specific to the at least one transducer or sensor of the sensing module, the sensing module configured to generate a raw or partially conditioned output signal; and
 wherein the signal conditioning block is configured to download all or some of the conditioning coefficients stored in the local memory of the sensing module, and the signal conditioning block is configured to utilize the downloaded conditioning coefficients to produce the conditioned output signal from the raw or partially conditioned output signal.

2. The modular sensor assembly according to claim 1, wherein a housing of the sensing module forms a first part of a connector and a housing of the signal processing module forms a second complementary part of the connector, wherein the first part of the connector interfaces with the second complementary part of the connector to removably mechanically couple the housing of the sensing module to the housing of the signal processing module.

3. The modular sensor assembly according to claim 2, wherein the connector also includes two or more electrical interconnects which form an electrical connection between the sensing module and the signal processing module when the first part of the connector is mechanically connected to the second complementary part of the connector.

4. The modular sensor assembly according to claim 1, wherein the signal conditioning block forms a part of an Application Specific Integrated Circuit (ASIC).

5. The modular sensor assembly according to claim 1, wherein the signal conditioning block further comprises a signal conditioning circuit programmed to process the raw or partially conditioned output signal received from the sensing module into the conditioned output signal using the downloaded conditioning coefficients.

6. The modular sensor assembly according to claim 1, wherein the signal conditioning block further comprises a memory, wherein the memory of the signal conditioning block stores another set of conditioning coefficients that are also used to produce the conditioned output signal from the raw or partially conditioned output signal.

7. The modular sensor assembly according to claim 1, wherein the at least one transducer or sensor comprises a flow sensor.

8. The modular sensor assembly according to claim 1, wherein the sensing module comprises a first sensor or transducer configured to sense a first physical parameter and a second sensor or transducer configured to sense a second physical parameter, wherein the first parameter and the second parameter are different from one another.

9. A modular sensor assembly, comprising:
 a signal processing module configured to be connected to an end-user device and configured to produce a substantially linearized output signal from a raw or partially conditioned output signal, the signal processing module comprising a signal conditioning block; and
 a sensing module housed separately from and coupled to the signal processing module, the sensing module comprising at least one sensor or transducer for sensing a physical parameter and a local memory configured to store a set of conditioning coefficients specific to the at least one sensor or transducer, the sensing module configured to generate a raw or partially conditioned output signal; and
 wherein the signal conditioning block is configured to download some or all of the conditioning coefficients stored in the local memory of the sensing module, and the signal conditioning block is configured to utilize the downloaded conditioning coefficients to produce the substantially linearized output signal from the raw or partially conditioned output signal.

10. The modular sensor assembly according to claim 9, wherein the sensing module is removably mechanically coupled to the signal processing module such that the sensing module can be disposed or replaced independently of the sensing module.

11. The modular sensor assembly according to claim 9, wherein a housing of the sensing module forms a first part of a connector and a housing of the signal processing module forms a second complementary part of the connector, wherein the first part of the connector interfaces with the second complementary part of the connector to removably mechanically couple the housing of the sensing module to the housing of the signal processing module.

12. The modular sensor assembly according to claim 9, wherein the sensing module comprises an electrical interconnect configured to mate within a corresponding electrical interconnect on the signal processing module, wherein the electrical interconnect facilitates the transfer of the raw or partially conditioned output signal and the conditioning coefficients from the sensing module to the signal processing module.

13. The modular sensor assembly according to claim 9, wherein the sensing module comprises a first sensor or transducer configured to sense a first physical parameter and a second sensor or transducer configured to sense a second physical parameter, wherein the first parameter and the second parameter are different from one another.

14. The modular sensor assembly according to claim 13, wherein the sensing module further comprises a third sensor or transducer configured to sense a third physical parameter.

15. The modular sensor assembly according to claim 13, wherein the sensing module comprises a flow sensor and a pressure sensor.

16. The modular sensor assembly according to claim 9, wherein the signal processing module further comprises a signal amplifier.

17. The modular sensor assembly according to claim 9, wherein the signal conditioning block further comprises a signal conditioning circuit programmed to process the raw or partially conditioned output signal received from the sensing module into the substantially linearized output signal using the set of conditioning coefficients stored in the local memory of the sensing module.

18. A method of using a modular sensor assembly to sense a physical parameter comprising:
mechanically coupling a separately housed sensing module to a signal processing module, wherein the sensing module is configured to generate a raw or partially conditioned output signal and comprises at least one sensor or transducer for sensing a physical parameter, the sensing module also including a local memory configured to retain a set of conditioning coefficients specific to the at least one sensor or transducer, and wherein the signal processing module comprises a signal conditioning block and is configured to produce a conditioned output signal from the raw output signal;
sensing a physical parameter using the at least one sensor or transducer;
generating a raw or partially conditioned output signal indicative of the sensed physical parameter;
downloading some or all of the conditioning coefficients to the signal processing module from the local memory of the sensing module to the signal processing module when the sensing module is mechanically coupled to the signal processing module;
producing a conditioned output signal using the downloaded conditioning coefficients; and
mechanically disconnecting the sensing module from the signal processing module.

19. The method according to claim 18, further comprising coupling the signal processing module to an end-user device.

20. The method according to claim 18, further comprising disposing of the sensing module once mechanically disconnected from the signal processing module.

* * * * *